United States Patent
Phibbs

[15] 3,647,185
[45] Mar. 7, 1972

[54] POWER-OPERATED PULLING IMPLEMENT

[72] Inventor: William Wayne Phibbs, Route 4, Lenoir City, Tenn. 37771

[22] Filed: Oct. 24, 1969

[21] Appl. No.: 869,207

[52] U.S. Cl. ............................................................. 254/30
[51] Int. Cl. ......................................................... E21b 19/00
[58] Field of Search ................................... 254/29–31, 132

[56] References Cited

UNITED STATES PATENTS 852,138  4/1907  Reidel ...................................... 254/31
2,482,950  9/1949  Toftey ................................ 254/132 X
3,059,905  10/1962  Tompkins ............................... 254/30

Primary Examiner—Othell M. Simpson
Attorney—Christen and Sabol

[57] ABSTRACT

A pulling implement includes a pair of opposed pivotally connected gripping jaws with toggle linkages arranged to exert force to close the jaws on an object to be pulled when the supporting framework is raised and thus pull the object thus gripped.

12 Claims, 6 Drawing Figures

INVENTOR
WILLIAM WAYNE PHIBBS

INVENTOR
WILLIAM WAYNE PHIBBS
BY Christen and Sabol
ATTORNEYS

POWER-OPERATED PULLING IMPLEMENT

This invention relates to pulling implements, and more particularly to a device which may be attached to the conventional three-point hitch of a tractor to be moved from place to place, such as for pulling tree stumps.

A feature of the invention is that a pair of gripping jaws are arranged on a framework in such a manner that pulling forces exerted on the framework, once the jaws have engaged with an object to be pulled, will cause the jaws to increase their grip on said object.

Still another feature resides in the fact that the jaws are arranged to be actuated by a power actuated device, such as a hydraulic piston and cylinder arrangement which can be operated from a source such as the hydraulic system of a tractor.

Other objects and advantages will be apparent to those skilled in the art after reading the following specification in connection with the annexed drawings.

Figure 1:
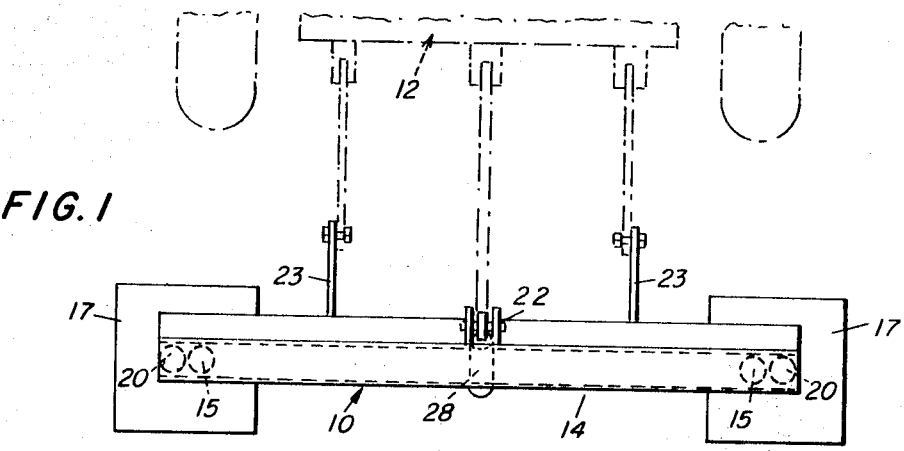
FIG. 1 is a plan view of a preferred form of tree pulling device in accordance with the invention.

In the figures, the tree pulling implement is indicated as having a frame means which may include a main frame, indicated generally by numeral 10, and a subframe, indicated generally indicated by numeral 11, which may be supported on a vehicle such as a tractor, indicated generally by numeral 12 for transportation the gripping device, indicated generally by numeral 13, from place to place.

The main frame preferably includes a horizontal beam 14 which is supported at its ends on vertical hydraulically operating jack means, such as the piston and cylinder devices 15. Power for these devices can be obtained through hoses (not shown) from a pump, on the tractor, or other source (not shown), and the lower ends of these jacks can be connected by swivels 16 to plates 17 for supporting the implement on the ground 18, or other supporting surface. Guidance for vertical movement of the beam can be provided by arms 19 which slide in the tubes 20 which are, in turn attached to a pair of horizontal braces 21 to comprise the sub frame 11. In addition, a bracket 22 may be attached to the upper brace, and brackets 23 to the lower brace for detachable connection with the usual three-point hitch of a standard tractor.

The gripping means 13 includes a pair of toothed jaw members extending generally at right angles from the plates 25, which are attached by pivots 26 to a connector 27 at one end of a hydraulically operated piston and cylinder device 28, the other end of which is supported at the middle of beam 14. Fluid for operating the device 28 can be supplied from the tractor or other source (not shown) in a conventional manner.

The gripping means also includes a pair of toggle linkages, indicated generally by numeral 29, which comprise arms 30, suspended from the beam by pivotal supports 31 and pivotally connected at their other ends 32 to arms 33. These arms are rigidly attached at their other ends to the jaws 24, or may be formed integrally therewith.

Figure 2:
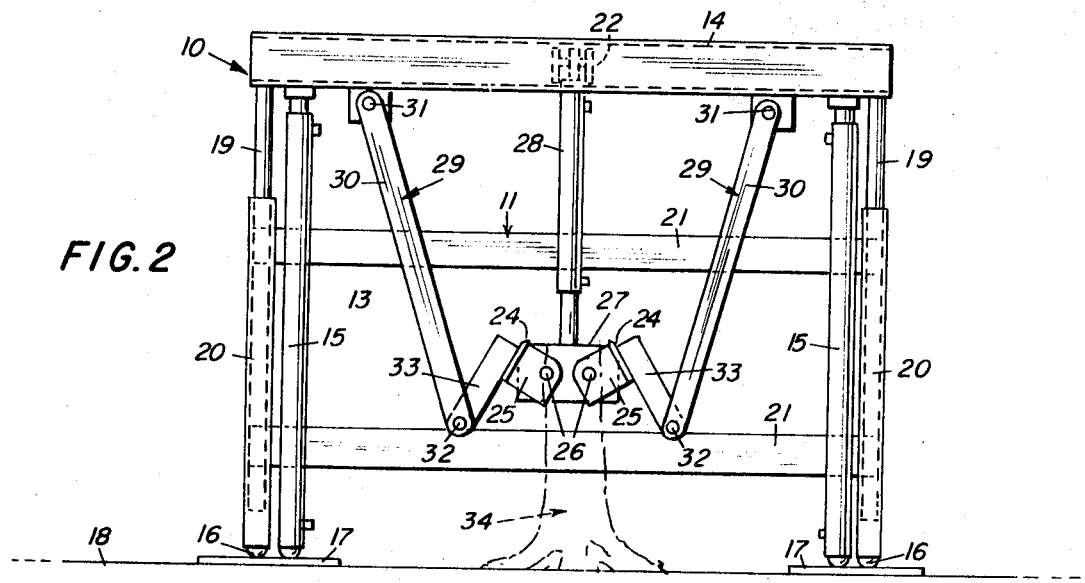
FIG. 2 is a front elevation of the device in its lowermost position with the gripping jaw members open.
Figure 3:
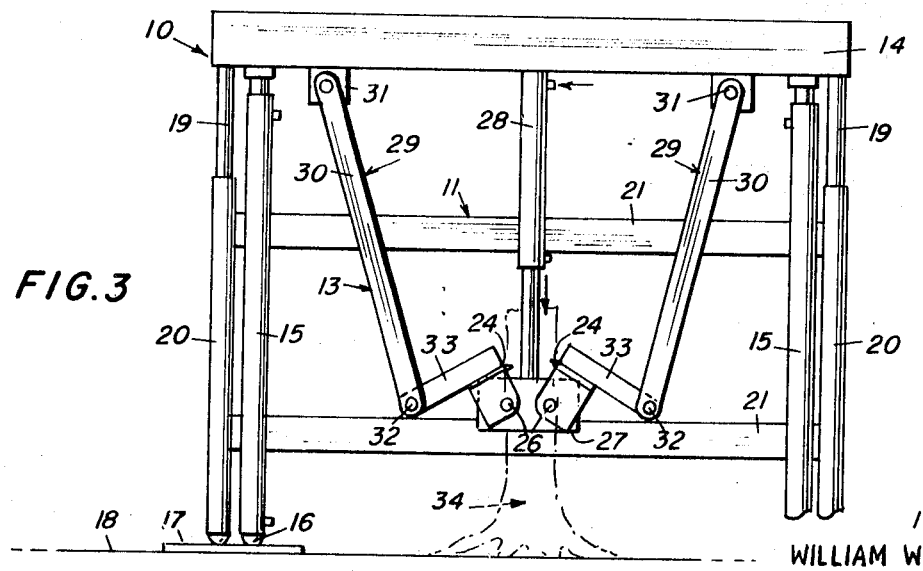
FIG. 3 is a view similar to FIG. 2 but with the jaw members moved toward a closed position.
Figure 4:
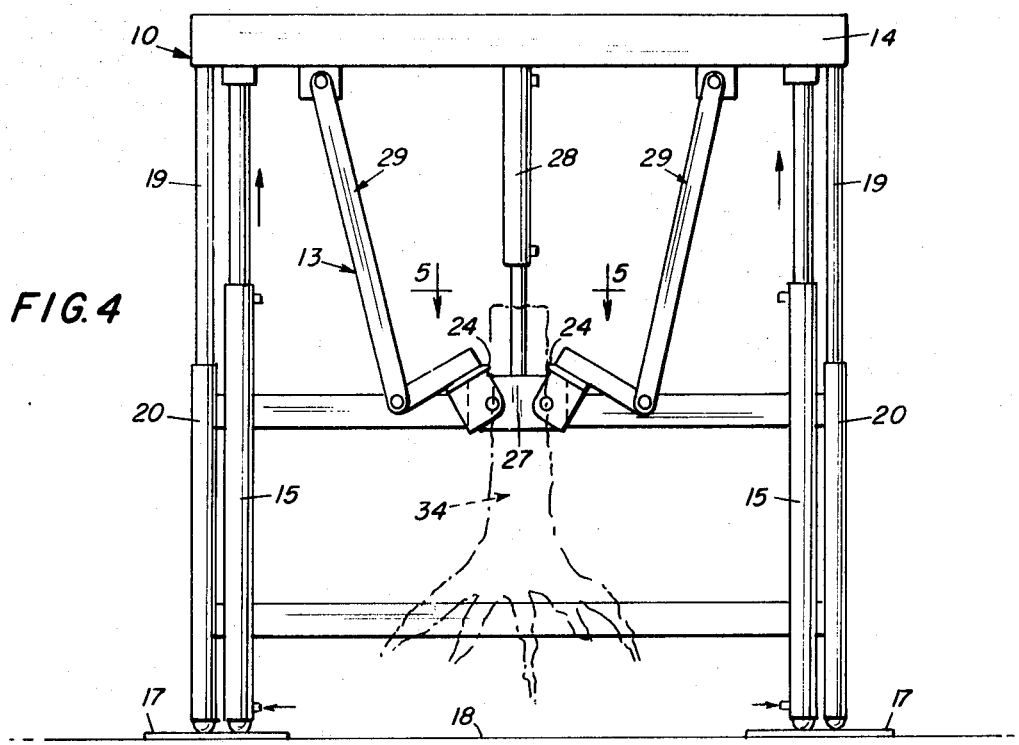
FIG. 4 is a view similar to FIG. 3, but with the object gripped by the jaws elevated.
Figure 5:
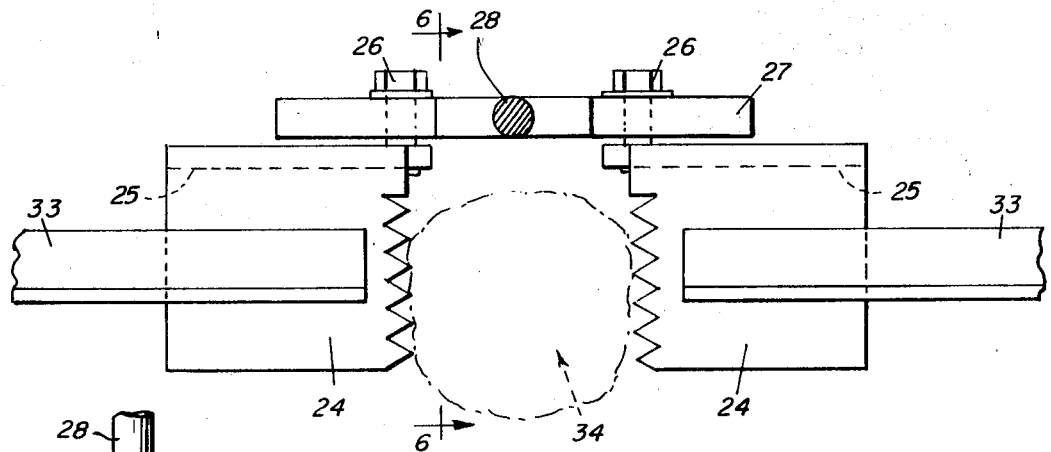
FIG. 5 is a detailed plan view of the jaw members taken on line 5—5 of FIG. 4.
Figure 6:
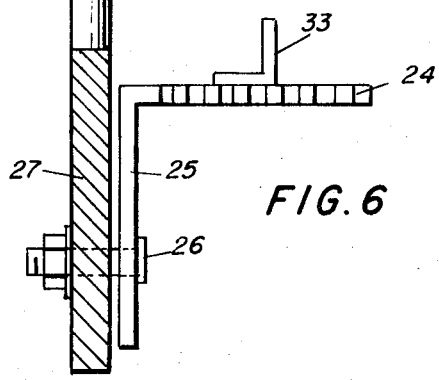
FIG. 6 is a detailed view taken on line 6—6 of FIG. 5.

In operation, the actuator device 28 is first retracted, as shown in FIG. 2 to open the jaws, and the frame is placed alongside a tree stump, indicated generally by numeral 34, with the plates 17 on the ground and the beam 14 in its lowermost position. By extending the hydraulic actuator 28 in the downward direction, the jaws will rotate towards each other to grip the stump, as in FIG. 3. To compensate for the fact that one of the jaws may engage the stump before the other, the actuator 28 may be swingably attached at its upper end to beam 14 to allow a small amount of sidewise movement of the lower end.

Further downward movement of the actuator will cause the jaws to increase their grip on the stump, after which the jacks 15 can be actuated to raise the beam and the gripper assembly as a unit with the stump being pulled up in the process.

While it is stated above that the grip of the jaws may be increased by downward movement of actuator 28, it should be observed that, once the jaws have cone into engagement with an object to be pulled, any upward movement of the beam 14 and the toggle linkages 29 will automatically tend to increase their rotational movement toward each other about the pivots 26. Thus, it is not always essential to do more with the actuator 28 than to bring the jaws into engagement with the object to be removed and, in some cases, it is sufficient to drop the jaws into place by the effect of gravity alone.

It should also be obvious that, while the hydraulic jacks 15 will enable a tremendous force to be applied to the beam 14 for exerting a heavy lifting force, there may be situations in which the force which can be exerted by the tractor lift will be sufficient. In such situations, the jacks will not be needed and after the main frame has been brought into position and the jaws 24 have been engaged with the objects, such as a stump, the entire assembly can be raised by the tractor lift to pull the stump upwardly.

It should also be understood that for light loads, where the main frame and jacks would be cumbersome to operate, the brackets 22 and 23 could be arranged so that the beam 14 is mounted directly on the lifting hitch of a tractor so as to utilize the tractor lift for transporting and operating the gripping jaws without assistance.

It will also be realized that, while the implement has been described in connection with pulling tree stumps upwardly in a vertical direction, it will be understood that it can be used to exert pulling forces on other objects and that it need not necessarily be confined to operating solely in a vertical plane, but can be adapted to exert a linear force in any direction away from a fixed support.

Other modifications and improvements may be made in the invention which will be apparent to those skilled in the art, which would come within the scope of the annexed claims.

I claim:

1. In material handling devices for exerting gripping and pulling force on an object such as a tree stump in a linear direction, the combination including frame means, means for positioning the frame means with respect to an object to be gripped and pulled, self-clamping jaw means for gripping engagement with opposite sides of an object to be pulled, and power actuated means for exerting force in said linear direction for actuating said self-clamping jaw means, said self-clamping jaw means including a pair of opposed jaw members, linkage means pivotally connecting saw jaw members with each other and with said frame means for concurrent movement of the jaw members toward and away from each other in response to linear displacement of the jaw members with respect to the frame means, and positive displacement two-way hydraulic actuator means connected between said frame means and said pair of opposed jaw members to control the positions of the jaw members with respect to each other.

2. The invention defined in claim 1, wherein said means for mounting the jaw members includes a pair of toggle linkages respectively connecting each jaw member with an element of the frame means.

3. The invention defined in claim 2, wherein said jaw members are pivotally mounted for movement about axes disposed in a common plane.

4. The invention defined in claim 3, wherein said frame means includes a support member to which one end of each of said toggle linkages is attached, and power actuated means for moving said support members with respect to an object with which said self-clamping jaw means is in engagement.

5. The invention defined in claim 3, wherein said frame means includes a support member to which one end of each of said toggle linkages is attached, and hydraulic ram means having one end connected with said support member, said pivotal mounting for the jaw members being connected with the other end of the ram means, whereby elongation and contraction of said ram means will actuate said jaw members.

6. The invention defined in claim 3, wherein said frame means includes a horizontally disposed beam, said toggle linkages being connected with said beam, and hydraulic jack means for raising and lowering said beam with respect to a support for said hydraulic jack means.

7. The invention defined in claim 6, wherein said frame means includes hydraulic ram means, said ram means having one end connected with said beam, the other end of the ram means including the pivotal mounting for the jaw members.

8. The invention defined in claim 6, wherein each of said toggle linkages include a pair of pivotally connected lever arms one of the free ends of one arm of each linkage being suspended from and pivotally connected with said beam, the free ends of the other arm of each linkage being secured to a respective jaw member, said jaw members having a common pivotal connecting means for rotational movement toward and away from each other in response to shifting movement of said common pivotal connecting means, and hydraulic means for urging said shifting movement.

9. The invention defined in claim 8, wherein said hydraulic means includes a piston and cylinder means connected between said beam and said common pivotal connecting means.

10. The invention defined in claim 9, wherein said frame means includes hydraulic jack means having one end attached to said beam and including means for supporting the other end of the jack means on a surface.

11. The invention defined in claim 10, wherein said hydraulic jack means includes a pair of piston and cylinder means and subframe means for positioning said piston and cylinder means in parallel relationship.

12. The invention defined in claim 11, wherein said subframe means includes attachment means for detachable connection with the drawbar means of a vehicle.

* * * * *